(12) United States Patent
Varveris

(10) Patent No.: US 6,249,277 B1
(45) Date of Patent: Jun. 19, 2001

(54) FINGER-MOUNTED STYLUS FOR COMPUTER TOUCH SCREEN

(76) Inventor: Nicholas G. Varveris, 538 Churchill Ave., Palo Alto, CA (US) 94301

(*) Notice: Subject to any disclaimer, the term of this patent is extended or adjusted under 35 U.S.C. 154(b) by 0 days.

(21) Appl. No.: 09/176,619

(22) Filed: Oct. 21, 1998

(51) Int. Cl.$^7$ ........................................ G09G 5/00
(52) U.S. Cl. ............................. 345/179; 345/157; 401/8
(58) Field of Search ........................... 345/156, 157, 345/168, 173, 179, 184; 178/19.01, 19.02, 19.03, 19.05, 19.06; 401/7, 8

(56) References Cited

U.S. PATENT DOCUMENTS

| 198,484 | 12/1877 | Briggs. | |
|---|---|---|---|
| 361,535 | 4/1887 | Merrick. | |
| 4,654,648 | * 3/1987 | Herrington et al. | 345/179 |
| 4,738,556 | * 4/1988 | Brown | 401/7 |
| 4,780,707 | * 10/1988 | Selker | 345/703 |
| 4,954,817 | 9/1990 | Levine | 340/706 |
| 5,405,206 | 4/1995 | Bedol | 401/7 |
| 5,627,648 | 5/1997 | Berkson et al. | 178/18 |
| 5,635,682 | 6/1997 | Cherdak et al. | 178/18 |
| 5,706,026 | 1/1998 | Kent et al. | 345/156 |
| 5,868,509 | * 2/1999 | Crutcher | 401/8 |
| 5,940,066 | * 8/1999 | Weinblatt | 345/179 |

OTHER PUBLICATIONS

Copy of 2 pages from Internet, entitled "Fingertip Styles", by Concept Kitchen (date unknown)*.

* cited by examiner

Primary Examiner—Steven Saras
Assistant Examiner—Fritz Alphonse
(74) Attorney, Agent, or Firm—Skjerven Morrill MacPherson LLP; David E. Steuber

(57) ABSTRACT

A finger stylus for a touch screen includes a flexible non-metallic elastic ring or a flexible, fabric-like strap having distal ends, each of the distal ends includes parts of an interconnect fastener such as a hooks and loops or a magnetic fastener. The ring or strap forms a wraparound for a human fingertip such that, in use, the bonding of the interconnect fastener parts about the fingertip or the elasticity of the ring firmly hold the strap against the fingertip. The ring or strap includes an intermediate portion including a loophole extending from an exterior surface of the intermediate portion which receives a longitudinal stylus rod extending through the loophole in a semi-friction-fit connection with the loophole. The rod in use is positioned to extend through the loophole generally transversely to the strap and above and beyond a user's fingertip for touching a touch screen. The stylus rod is made of a non-marking material with generally rounded shaped ends.

9 Claims, 2 Drawing Sheets

FINGER-MOUNTED STYLUS FOR COMPUTER TOUCH SCREEN

BACKGROUND OF THE INVENTION

1. Field of the Invention

This invention relates to writing stylus for "touch screen" devices. "Touch screen" devices are devices that can sense and record when an object contacts their surface. The invention relates to such devices that sense and record or relay data when contacted by passive-non-electrical objects. Particularly, the invention is directed to a writing stylus for touch screen devices that the user can wear on or attach to their finger.

2. Related Art

Recently personal digital assistants ("PDA's") such as the Palm Pilot from 3COM, Microsoft Windows CE based handheld PC's, the Apple Newton, or personal organizers such as the Sharp Zaurus have been produced with touch sensitive screens. These computing devices typically include a simple wooden or plastic pen-type stylus with a non-marking tip. The stylus is touched to the screen in order to act like a mouse (to move the cursor, highlight text, etc.) or to enter information (characters for handwriting recognition, drawings, etc.). A non-marking implement is used so that the screen of the device will not be scratched or damaged when touched. In addition, these pen-style styli must usually be over four inches (10 cm.) long to be properly supported by a user's hand. This requires a significant amount of space, within the case of a touch screen device, for storage of the stylus.

Moreover, the stylus for such devices is often lost. Copies of the original stylus may or may not be available. Therefore replacement styli are necessary. In addition, existing styli are pen-shaped. This requires the user to stop what they are doing and pick up or put down these specialized styli when they wish to enter information in the touch screen device while doing other work such as typing or writing. In place of the normal stylus a user will occasionally use a fingertip as a stylus; unfortunately a fingertip is blunt and a user often cannot position their finger with sufficient accuracy to locate the cursor or enter other data where needed on the screen.

Recently two patents have been issued regarding digital styli to the A. T. Cross Company. These U.S. Pat. Nos. 5,635,682 and 5,627,348 cover the creation of a replaceable non-marking stylus core in conventional pen-shaped writing instruments, and the composition of the non-marking stylus tip that will produce a "sound and feel" comparable to traditional writing on paper. Neither of these inventions contemplate the use of a non-marking stylus attached to or covering a portion of a user's finger.

Other prior art contemplates the use of a writing implement, i.e., a pencil or pen, attached to a finger. For example, U.S. Pat. No. 198,484 of 1877 uses a perforated finger sleeve to attach a pen, "a pencil or other writing or marking instrument" to one's finger. Other patents, including U.S. Pat. No. 361,535 of 1887, and U.S. Pat. No. 5,405,206, use an assortment of rings, metal clamps or thimble type devices to attach writing instruments (most of which use ink or some other physical marking process) to one's finger. U.S. Pat. No. 4,738,556 uses a Velcro strap to secure a pen in-line with the end of a finger. A recent fingertip stylus device has been shown on the Internet. The device is a rotatable bent wire ring including a tip extension for contacting a touch screen. Still other prior art contemplates the use of finger mounted writing implements for digital tablets, however, these patents contemplate use of devices which gather or send electrical signals from the device tips and do not contemplate a passive, non-marking tip. These patents include U.S. Pat. No. 4,954,817 and U.S. Pat. No. 5,706,026.

SUMMARY OF INVENTION

Generally, the purpose of the device is to provide a stylus for touch screen devices that the user can wear on or attached to their finger. It will allow a user to enter data on a touch screen without having to hold a separate stylus or pen-type implement, and will allow users to type on a keyboard or hold a normal (marking) pen without having to remove or adjust the finger mounted stylus, hereinafter called the "finger stylus".

The current invention provides a finger stylus that can be attached in a variety of ways to the user's finger. It uses a strap type body with an easily removable fastener (such as a Velcro® hook and loop type material, or a magnetic clasp) or can be an elastic fabric or rubber ring, each with a passive non-marking tip attached or incorporated therein. The device will be attached to or cover a portion of the finger. The device may be manufactured as two or more pieces so that the attachment or "strap" portion of the preferred embodiment of the device and the non-marking tip can be made of different materials. The attachment or "strap" portion of the device can be made entirely of plastic "Velcro" material, or of rubber, leather, or fabric with Velcro material or other separable fastener at the ends. The non-marking tip of the device extends outwardly from a position above or to the side of a user's finger and in a general parallel direction to the user's fingertip so as not to interfere with a user's ability to type or otherwise use the finger. Since the non-marking tip may wear down with use and require replacement, the finger stylus preferably has a replaceable non-marking tip. The non-marking tip may be made of different materials such as wood, plastic or hard rubber or a combination of these and be of different shapes so that it can work on different screen surfaces without marking. The non-marking finger mounted stylus can be used not only with self contained touch screen "PDA's", etc. but also with touch screen tablets or pads attached to other computing devices or computers, and other electrical devices incorporating touch screens such as cellular phones, etc.

The present invention will allow a user to enter data on a touch screen without having to hold a separate stylus or pen type implement, and will allow a user to type on a keyboard or hold a normal (marking) pen without having to remove or adjust the finger mounted stylus. The finger stylus on the user's finger will not interfere with the user's ability to perform other work such as typing, traditional cursory writing with a pen, operating a computer mouse, etc. while the finger stylus remains affixed to the user's finger.

The non-marking finger stylus can be rolled, unrolled, flattened or folded to a very small size so that it can be easily carried, or attached to or contained in touch screen devices, for example, by attaching the stylus fastening part to a complementary portion of Velcro material affixed to an edge of the computer screen or case. The finger stylus is adjustable longitudinally with respect to the user's finger so that the tip may accurately contact target areas of a touch screen device. The finger stylus is simple to use, inexpensive to make and is comfortable to wear or have attached to one's finger. The finger stylus cushions and redirects the impact force, resulting from the repetitive contact of the non-marking tip with the screen, away from the tip of ones finger or finger nail. The non-marking tip can be extended or retracted various distances beyond the tip of the user's finger to adjust for various finger lengths, finger diameter and fingernail length. Non-marking tips of various materials and shapes are provided for contacting the surface of a particular touch screen device. The non-marking tip can be extended various distances to compensate for the erosion of the non-marking tip as the tip is used. The finger stylus is so light-in-weight, e.g., about 1.4 grams, that after a minute or so the user is no longer aware that it is on his or her fingertip.

The finger stylus for a touch screen includes a flexible non-metallic elastic ring, or fabric-like strap having distal ends, each of the distal ends includes parts of an interconnect fastener such as a hooks and loops or a magnetic fastener. The strap forms a wraparound for a human fingertip such that, in use, the bonding of the interconnect fastener parts about the fingertip firmly hold the strap against the fingertip. The ring or strap includes an intermediate portion or loop including a loophole extending from an exterior surface of the intermediate portion which receives a longitudinal stylus rod extending through the loophole in a semi-friction-fit connection with the loophole. The rod in use is positioned to extend through the loophole generally transversely to the strap and above and beyond a user's fingertip for touching a touch screen.

The distal ends of the strap can be crossed i.e., the ends being at an angle to each other, creating a funnel shape to compensate for the taper of a user's fingertip. This also helps keep the strap and stylus from slipping away from the tip of the finger as the stylus is used.

BRIEF DESCRIPTION OF THE DRAWINGS

The above mentioned purposes and advantages of the present invention will become apparent from the following description taken in connection with the accompanying drawings.

DETAILED DESCRIPTION

Figure 1:
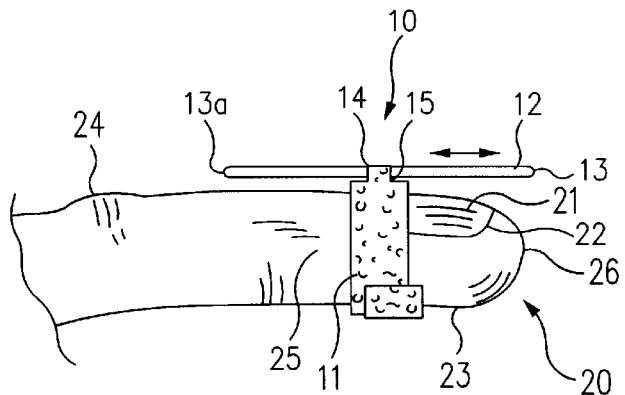
FIG. 1 is a side view of a preferred embodiment of the finger stylus of the invention as temporarily affixed to a human fingertip.

FIG. 1 depicts a flexible strap-type finger stylus 10 including a strap 11 having a stylus rod 12 with a non-marking generally curved tip 13. The rod passes through a loophole 14a or a substantially half bend formed by two parallel through slits 15 in an intermediate portion 11a (FIG. 4) of the strap. The slits 15 extend from an upper surface 11b of the flexible strap portion 11a to the bottom surface 11c of the strap 11. The distal ends 17, 18 of the strap include a reusable interconnect fastener such as magnetic pads or a hooks and loops type fastener (such as that sold under the trademark Velcro® material).

A plastic, fairly rigid rubber or wood non-marking stylus rod 12 having a non-marking tip 13 is inserted into and held in the loophole 14a in a semi-friction-fit. "Semi-friction-fit" as used herein means that the stylus rod will not appreciably shift in making stylus contact with a touch screen but it is movable by a user to a desired to and fro position by a user pulling or pushing the rod with respect to the loophole.

As seen in FIG. 1 the finger stylus is preferably affixed to a user's finger 20 at a fingertip portion 25 extending outwardly from a first finger joint 24. The overall strap 11 in use preferably overlaps the base of fingernail 21 leaving the user's fingertip pad 23 exposed so that the strap does not interfere with typing or the tactile feel of the natural fingertip pad. The tip 13 of stylus rod 12 in use preferably extends beyond the tip 22 of fingernail 21 and the distal end 26 of the fingertip. While the stylus preferably extends over the finger top the strap or ring can be rotated to a position in either direction up to 90° so as not to grossly interfere with an adjacent finger.

Figure 4:
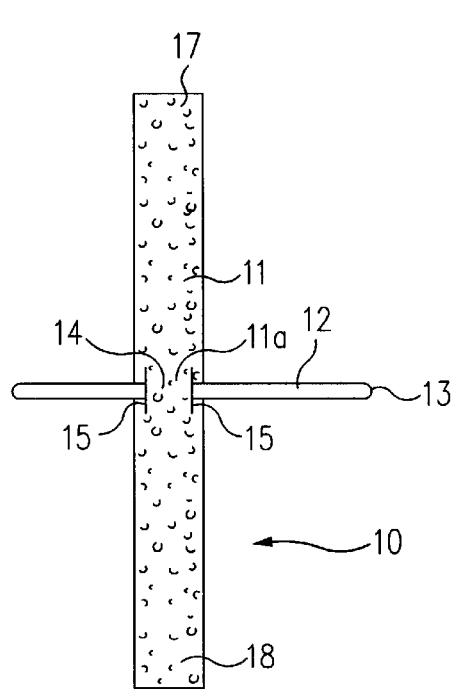
FIG. 4 is a top plan view of FIG. 1.
Figure 3:
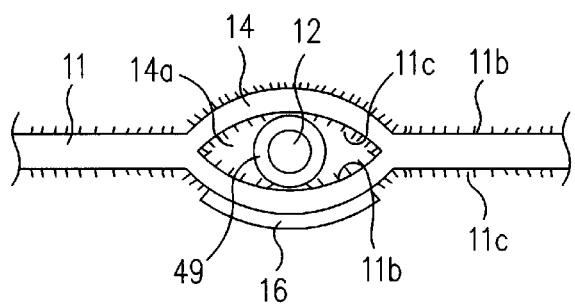
FIG. 3 is a partial side view of the finger stylus and strap per se showing a friction ring portion of another embodiment.

The strap and stylus rod per se are shown in FIGS. 3 and 4. Loops of the hooks and loops fastener material are shown on one surface 11b of the strap while the hooks are shown on the opposite surface 11c of the strap. A loophole cover or pad 16 made of plastic, rubber, or fabric material may extend under the loophole and be affixed by an adhesive or complementary hook or loop fabric fastener. The purpose of this pad is to smooth the underneath surface of the loopholes that contact the top or side of the finger. The pad can also provide additional friction with the stylus rod. It is relatively non-stretchable and thus restricts stretching of the overlying band material. Also a friction pad or ring 49 (FIG. 3) may be inserted and affixed in the loophole with the stylus rod passing therethrough to keep the rod in place during touching of the touch screen while later permitting movement of the rod to adjust its position relative to the ring and the loophole.

Figure 2:
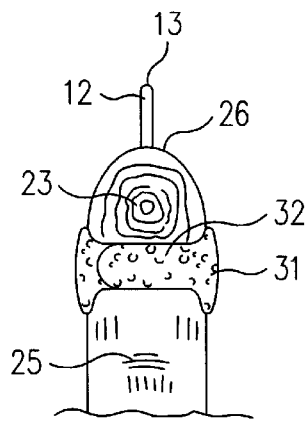
FIG. 2 is a bottom view of the FIG. 5 embodiment.
Figure 5:
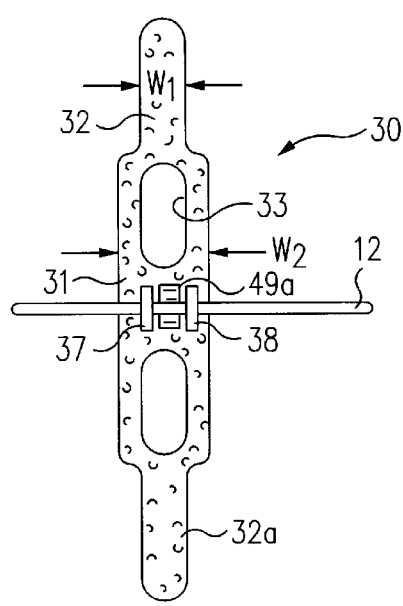
FIG. 5 is a top plan view of a third embodiment.

FIG. 2 illustrates the user's finger bottom facing the user's palm, where a modified embodiment of the strap is shown. As seen in FIG. 5 the distal ends 32 and 32a of the strap are narrower in width $W_1$ than the width $W_2$ of the intermediate portion 31 of the strap 30. This allows more of the whorls-containing fingertip pad 23 to be exposed when the strap is wrapped around the fingertip as clearly shown in FIG. 2. FIGS. 1 and 2 also show the preferred location of stylus rod tip 13 extending outwardly beyond the end 22 of fingernail 21 so as to easily access a touch screen while not interfering with other uses of the fingertip and the fingertip pad 23. The proximal end 13a of the rod 12 extends above and is spaced from fingertip portion 25 and joint 24 so as to allow complete finger flexing at the joint without contacting end 13a.

Figure 6:
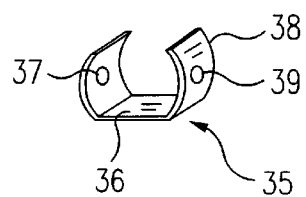
FIG. 6 is a perspective view of a spring clip for holding the stylus rod in the third embodiment.
Figure 7:
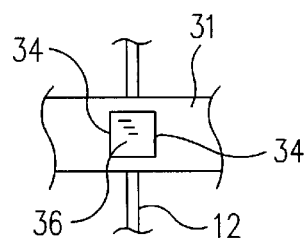
FIG. 7 is a partial bottom view of the clip, the stylus rod and the strap.

FIGS. 5–7 illustrate another embodiment 30 of the invention where the stylus rod is held in a semi-friction-fit in a U-shaped plastic or metal (such as brass) clip 35. Bight 36 of the clip seats on the underside of an intermediate portion 31 of the strap and the legs 37, 38 are inserted into and through slits 34 in the strap. Each leg includes an aperture 39 which apertures are aligned for receipt of the stylus rod 12. The legs 37 and 38 may be slightly bowed to insure that a semi-friction-fit is provided. A friction pad or ring 49a may be fixed to portion 31 between the legs 37 and 38 to augment the friction against the stylus rod. Apertures 33 may be provided in the strap to lighten the finger stylus and to allow ambient air to access the user's fingertip and to thereby avoid a sweating condition on the fingertip. The apertures 33 also aid in making the strap more easily rolled-up for storage.

Figure 8:
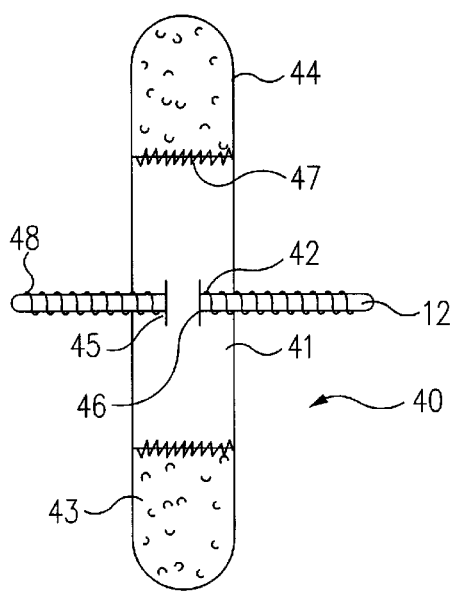
FIG. 8 is a top plan view of a fourth embodiment of the invention.

FIG. 8 shows a third embodiment 40 where a leather or fabric intermediate portion 41 is provided having a loophole 42. A hooks and loops connector fastener 43, 44 is attached by a threaded or by an adhesive hem or the like to the ends 47 of portion 41. FIG. 8 also illustrates a stylus rod having an outer surface with a serrated or castellated or other surface irregularities 48, the surface providing the desired semi-friction-fit with the interior of loophole 42, formed by slits 45, 46.

Figure 9:
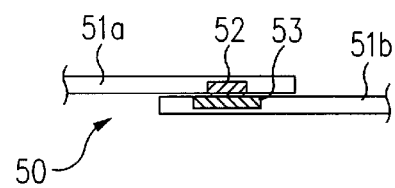
FIG. 9 is a partial side view of a fifth embodiment of the invention.

FIG. 9 schematically illustrates a further embodiment 50 where the distal ends 5a and 51b of the strap each include a magnet element 52, 53 which coact together to hold the strap distal ends in a wraparound condition about a user's fingertip. Element 53 is shown as longer in length than element 52 so as to accommodate the diameter of particular fingertips of various users.

Figure 10:
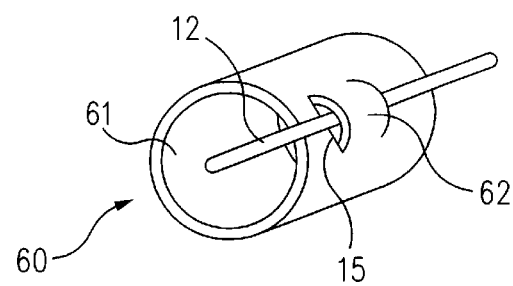
FIG. 10 is a perspective view of a ring embodiment of the invention.

FIG. 10 shows a ring embodiment 60 of the invention where an elastic fabric or rubber ring 61 is sized to be pushed or rolled onto a user's finger tip with the stylus 12 inserted into loophole 62. As shown the loophole may be positioned displaced from the top side of the user's fingertip.

A practical fingertip stylus must have several features. It must have a non-marking tip. It must be light, comfortable, low cost, and must adapt to a wide variation in the shape and size of people's fingers. The preferred embodiments of the invention illustrated in FIGS. 1–9 satisfy these criteria.

The non-marking tip 13 is made of a shape and a material of a hardness such that it will not damage the surface of a touch screen device. The non-marking tip will be of a hardness less than the hardness of the touch screen device surface. As a result the tip 13 may wear over time and be diminished in length. However, the invention compensates for this by permitting the non-marking tip to be slid forward in the loophole, or entirely replaced.

In addition, the friction pad or ring 49 may be an elastic material, which stretches when pressure is applied to the non-marking tip creating a spring-type action to the tip of the device. It is further contemplated that that the pressure or force necessary to make the non-marking tip move in the loophole is less than the pressure that would result in damage to the screen of the device, but greater than the pressure necessary for the touch screen device to be activated or to generate an input. Thus, the semi-friction-fit mechanism will further prevent damage to the touch screen device.

The non-marking tip may be positioned off the center axis of ones finger so that the tip will not interfere with such tasks as typing. A further advantage of locating the non-marking tip (essentially longitudinally tangential to the user's finger) is that its back end 13a does not contact the finger as shown in FIG. 1. This is beneficial because the shock of the impact from the tip's contact with the surface of the touch-screen device is not transferred directly to the user's fingertip. Instead it is spread and dissipated by the strap and friction pad.

The fingertip stylus strap may be rolled or folded for storage in a special case or for storage in a special compartment designed for that purpose inside the touch screen device case. The fingertip stylus provides the advantage of taking up less space than a traditional stylus. When rolled it can also function like a short regular stylus.

While specific embodiments of the invention have been described, the invention is not limited to those specifics and modifications or design detail changes can be made without departing from the scope and spirit of the invention.

What is claimed is:

1. A finger stylus for a touch screen comprising:

a flexible non-metallic elastic ring or a flexible strap having distal ends, each of the distal ends including at least parts of an interconnect fastener, the strap forming a wraparound for a human fingertip such that in use the bonding of the interconnect fastener parts about the fingertip firmly holds the strap against the fingertip;

wherein the ring or strap includes an intermediate portion including a loophole extending from an exterior surface of the intermediate portion, the loophole being formed by at least two cuts in the strap or ring intermediate portion; and further including a longitudinal stylus rod extending through said loophole in a semi-friction-fit connection with the loophole, the rod in use being positioned to extend through the loophole generally transversely to the ring or strap and above or to the side and beyond a user's fingertip for touching a touch screen.

2. The finger stylus of claim 1 wherein the entire strap is constructed of a hooks and loops material, the hooks being on a first surface of the strap and the loops being on a second opposite surface of the strap.

3. The finger stylus of claim 1 in which said strap includes a leather or fabric intermediate portion attached to the interconnect fastener.

4. The finger stylus of claim 1 wherein a portion of said strap between said distal ends and said intermediate portion are apertured for allowing ambient air to access the user's fingertip.

5. The finger stylus of claim 1 wherein a transverse width of the distal ends of the strap is less than a transverse width of the intermediate portion of the strap such that the strap does not interfere with a user's fingertip pad during a typing operation.

6. The finger stylus of claim 1 further including a friction pad associated with the ring or strap and in semi-friction contact with said stylus rod.

7. The finger stylus of claim 1 further including a loophole cover extending under the loophole.

8. A finger stylus for a touch screen comprising:

a flexible non-metallic elastic ring or a flexible strap having distal ends, each of the distal ends including at least parts of an interconnect fastener, the strap forming a wraparound for a human fingertip such that in use the bonding of the interconnect fastener parts about the fingertip firmly holds the strap against the fingertip;

wherein the ring or strap includes an intermediate portion including a loophole extending from an exterior surface of the intermediate portion; and further including a longitudinal stylus rod extending through said loophole in a semi-friction-fit connection with the loophole, the rod in use being positioned to extend through the loophole generally transversely to the strap and above or to the side and beyond a user's fingertip for touching a touch screen, wherein said stylus rod includes a series of surface irregularities such that said stylus rod is held in the semi-friction-fit connection in the loophole.

9. A finger stylus for a touch screen comprising:

a flexible non-metallic elastic ring or a flexible strap having distal ends, each of the distal ends including at least parts of an interconnect fastener, the strap forming a wraparound for a human fingertip such that in use the bonding of the interconnect fastener parts about the fingertip firmly holds the strap against the fingertip;

wherein the ring or strap includes an intermediate portion including a loophole extending from an exterior surface of the intermediate portion; and further including a longitudinal stylus rod extending through said loophole in a semi-friction-fit connecting with the loophole, the rod in use being positioned to extend through the loophole generally transversely to the ring or strap and above or to the side and beyond a user's fingertip for touching a touch screen;

wherein a pair of parallel and longitude cuts are formed in the strap or ring intermediate portion; and wherein the loophole comprises a U-shaped clip having a bight portion embedded in an inner surface of the strap intermediate portion and a pair of legs extending through the pair of parallel and longitudinal cuts in the intermediate portion, said legs having aligned apertures for reception of the stylus rod in the semi-friction-fit connection.

* * * * *